(12) United States Patent
Kim et al.

(10) Patent No.: US 8,436,956 B2
(45) Date of Patent: May 7, 2013

(54) DISPLAY APPARATUS

(75) Inventors: Sungwoon Kim, Suwon-si (KR);
Joonyung Jang, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 211 days.

(21) Appl. No.: 13/090,113

(22) Filed: Apr. 19, 2011

(65) Prior Publication Data
US 2012/0008058 A1 Jan. 12, 2012

(30) Foreign Application Priority Data
Jul. 7, 2010 (KR) .......................... 10-2010-0065535

(51) Int. Cl.
*G02F 1/136* (2006.01)
(52) U.S. Cl.
USPC ............................................. 349/43
(58) Field of Classification Search ...................... 349/43
See application file for complete search history.

(56) References Cited

U.S. PATENT DOCUMENTS

| 8,199,301 B2 * | 6/2012 | Oh et al. ........................ 349/141 |
| 2006/0192906 A1 * | 8/2006 | Ryu et al. ........................ 349/43 |
| 2009/0185116 A1 * | 7/2009 | Song et al. ..................... 349/107 |

FOREIGN PATENT DOCUMENTS

| KR | 1020020054916 A | 7/2002 |
| KR | 1020030058333 A | 7/2003 |
| KR | 1020080073420 A | 8/2008 |
| KR | 1020090053565 A | 5/2009 |

* cited by examiner

*Primary Examiner* — Sung Pak
(74) *Attorney, Agent, or Firm* — Innovation Counsel LLP

(57) ABSTRACT

In a display apparatus, each pixel includes a gate line, a storage line spaced apart from the gate line, and a data line crossing the gate line. The pixel includes a switching device connected to the gate line and the data line, a protective layer provided with an opening formed therethrough in an area where the gate line and the storage line are arranged adjacent to each other, and a pixel electrode arranged on the protective layer to be connected to the switching device and overlapped with the storage line. The opening is overlapped either the gate line or the storage line. Thus, a direct-current electric field is formed between the gate line and the storage line corresponding to an area where the opening in the protective layer is formed, and impurity ions are trapped by the direct-current electric field.

20 Claims, 15 Drawing Sheets

DISPLAY APPARATUS

CROSS-REFERENCE TO RELATED APPLICATION

This application relies for priority upon Korean Patent Application No. 10-2010-0065535 filed on Jul. 7, 2010, the contents of which are herein incorporated by reference in their entirety.

BACKGROUND

1. Field of Disclosure

The present invention relates to a display apparatus having an improved display quality.

2. Description of the Related Art

In general, a liquid crystal display (LCD) includes an array substrate, an opposite substrate facing the array substrate, and a liquid crystal layer disposed between the array substrate and the opposite substrate. Pixels are arranged on the array substrate to display an image.

When the LCD is driven for a long period of time, an after-image in a line or surface shape can occur on the display screen due to movement of impurity ions. In general, line-shaped after-images occur when ion components in the liquid crystal accumulate at the boundary between patterns that are driven to have different gray scales from each other. Surface-shaped after-images occur when residual DC components, which are generated by impurity ions, cause a brightness difference.

SUMMARY

Embodiments of the present invention provide a display apparatus capable of reducing an after-image caused by impurity ions to improve a display quality thereof.

According to the embodiments, a display apparatus includes a first substrate on which a plurality of pixels is arranged and a second substrate coupled to the first substrate to face the first substrate. Each of the pixels includes at least one gate line, at least one storage line that is spaced apart from the gate line in a plan view, at least one data line that crosses the gate line, at least one switching device connected to the gate line and the data line, a protective layer provided with a first opening that is formed in an area where the gate line and the storage line are arranged adjacent to each other, and at least one pixel electrode arranged on the protective layer and overlapped with the storage line.

The first opening is overlapped with at least one of the gate line, the storage line, and both of the gate and data lines.

According to the above, the protective layer is provided with the opening that is overlapped with the storage line and the gate line to form a direct-current electric field between the storage line and the gate line.

Thus, the direct-current electric field generated between the storage line and the gate line may increase, and impurity ions may be trapped within the opening where the direct-current electric field is formed. As a result, a line-shaped after-image or a surface-shaped after-image caused by the impurity ions may be reduced.

BRIEF DESCRIPTION OF THE DRAWINGS

The above and other advantages will become readily apparent by reference to the following description when considered in conjunction with the accompanying drawings, wherein.

DETAILED DESCRIPTION

Figure 1:
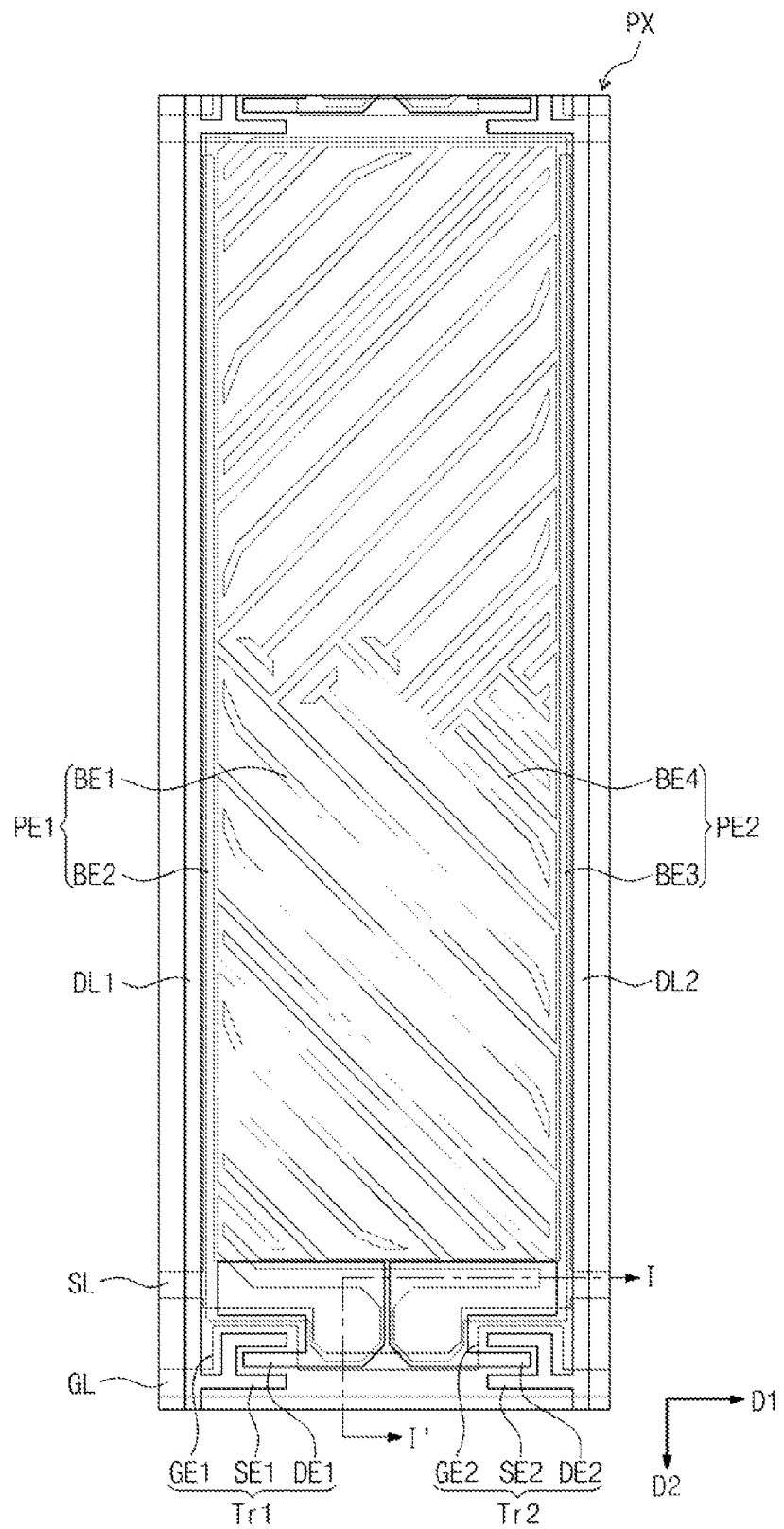
FIG. 1 is a plan view showing a liquid crystal display according to an exemplary embodiment.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation of the device. The device may be otherwise oriented (e.g., rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
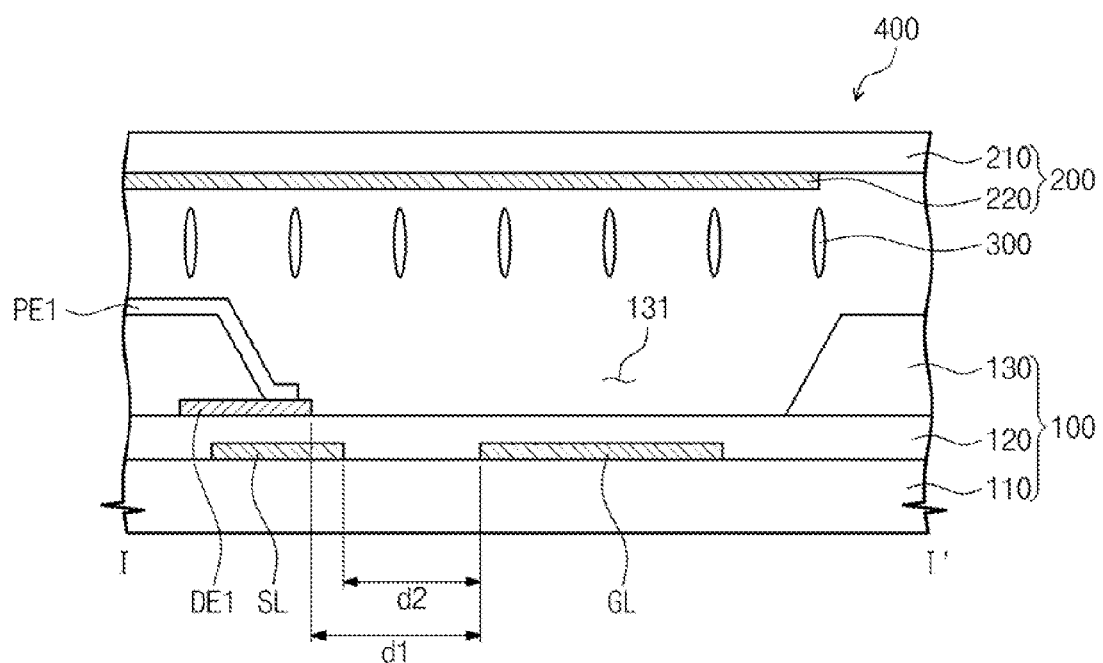
FIG. 2 is a cross-sectional view taken along a line I-I' of FIG. 1.

FIG. 1 is a plan view showing a liquid crystal display according to an exemplary embodiment, and FIG. 2 is a cross-sectional view taken along a line I-I' of FIG. 1.

The liquid crystal display includes a plurality of pixels, but for convenience of explanation, just one of the pixels will be described in detail in FIGS. 1 and 2 as all of the pixels have the same structure and function, and thus detailed descriptions of others will be omitted.

Referring to FIGS. 1 and 2, a liquid crystal display 400 includes a first substrate 100 on which a pixel PX is arranged, a second substrate 200 coupled to the first substrate 100 and facing the first substrate 100, and a liquid crystal layer 300 interposed between the first substrate 100 and the second substrate 200.

The first substrate 100 includes a first base substrate 110, and the pixel PX is arranged on the first base substrate 110. The pixel PX includes at least one gate line GL extending in a first direction D1, a first data line DL1 extending in a second direction D2 that is substantially perpendicular to the first direction D1, a second data line DL2 arranged substantially in parallel to the first data line DL1, and a storage line SL spaced apart from the gate line GL in a plan view.

The gate line GL receives a gate signal, the first data line DL1 receives a first data voltage, and the second data line DL2 receives a second data voltage having a different voltage level from the first data voltage. The storage line SL receives a common voltage. The first data voltage may have a different polarity from the second data voltage with reference to the common voltage. As an example, the common voltage may be set to a direct current voltage having a voltage level of about 0 volts to about 7 volts. Thus, in a case in which the first data voltage is set to a voltage level that is higher than the common voltage, so that it has a positive (+) polarity, the second data voltage may be set to a voltage level that is lower than the common voltage, so that it has a negative (−) polarity.

In addition, the pixel PX further includes a first thin film transistor Tr1, a second thin film transistor Tr2, a first pixel electrode PE1, and a second pixel electrode PE2.

The first thin film transistor Tr1 includes a first gate electrode GE1 that is branched off from the gate line GL, a first source electrode SE1 that is branched off from the first data line DL1, and a first drain electrode DE1 electrically connected to the first pixel electrode PE1. The second thin film transistor Tr2 includes a second gate electrode GE2 that is branched off from the gate line GL, a second source electrode SE2 that is branched off from the second data line DL2, and a second drain electrode DE2 electrically connected to the second pixel electrode PE2.

Thus, the first and second thin film transistors Tr1 and Tr2 are substantially simultaneously turned on in response to the gate signal applied to gate line GL. The turned-on first thin film transistor Tr1 transmits the first data voltage, which it receives from the first data line DL1, to the first pixel electrode PE1. Also, the turned-on second thin film transistor Tr2 transmits the second data voltage, which it receives from the second data line DL2, to the second pixel electrode PE2.

The first pixel electrode PE1 includes a first base electrode BE1, and a plurality of first branch electrodes BE2 that are branched off from the first base electrode BE1. The first base electrode BE1 may include a portion that is substantially parallel to the first direction D1 in which the gate line GL is extended, and a portion that is substantially parallel to the second direction D2 in which the first and second data lines DL1 and DL2 extend. The first branch electrodes BE2 extend substantially in parallel to each other and are spaced apart from each other with a predetermined distance. Also, the first branch electrodes BE2 may extend in a direction that is inclined at a predetermined angle with respect to the gate line GL. In the present exemplary embodiment, each of the first branch electrodes BE2 may be formed at an inclined angle of about 0 degrees to about 60 degrees with respect to the direction D1 in which the gate line GL extends.

The second pixel electrode PE2 includes a second base electrode BE3 insulated from the first base electrode BE1, and a plurality of second branch electrodes BE4 that are branched off from the second base electrode BE3. The second base electrode BE2 may include a portion that is substantially parallel to the first direction D1 in which the gate line GL is extended, and a portion that is substantially parallel to the second direction D2 in which the first and second data lines DL1 and DL2 extend. The second branch electrodes BE4 extend in parallel to each other and are spaced apart from each other with a predetermined distance. The second branch electrodes BE4 have a structure that is similar to that of the first branch electrodes BE2. Also, each of the second branch electrodes BE4 is arranged between two first branch electrodes BE2 that are adjacent to each other. Therefore, the first and second branch electrodes BE2 and BE4 are alternately arranged in an area where the pixel PX is formed.

Because the first data voltage and the second data voltage having different polarities from each other with reference to the common voltage are applied to the first and second pixel electrodes PE1 and PE2, respectively, an electric field is formed on the first substrate 100 along a direction that is substantially parallel to an upper surface (that is, a horizontal direction) of the first base substrate 110 by the first and second pixel electrodes PE1 and PE2.

Meanwhile, when no electric-field is applied (OFF state), the liquid crystal molecules in liquid crystal layer 300 are vertically aligned (that is, approximately perpendicular) with respect to the upper surface of the first base substrate 110, as is shown in FIG. 2. When the electric field is formed between the first and second pixel electrodes PE1 and PE2, the liquid crystal molecules may be aligned along a direction of the electric field.

Hereinafter, a method of manufacturing the first substrate 100 will be described in detail.

Figure 3:
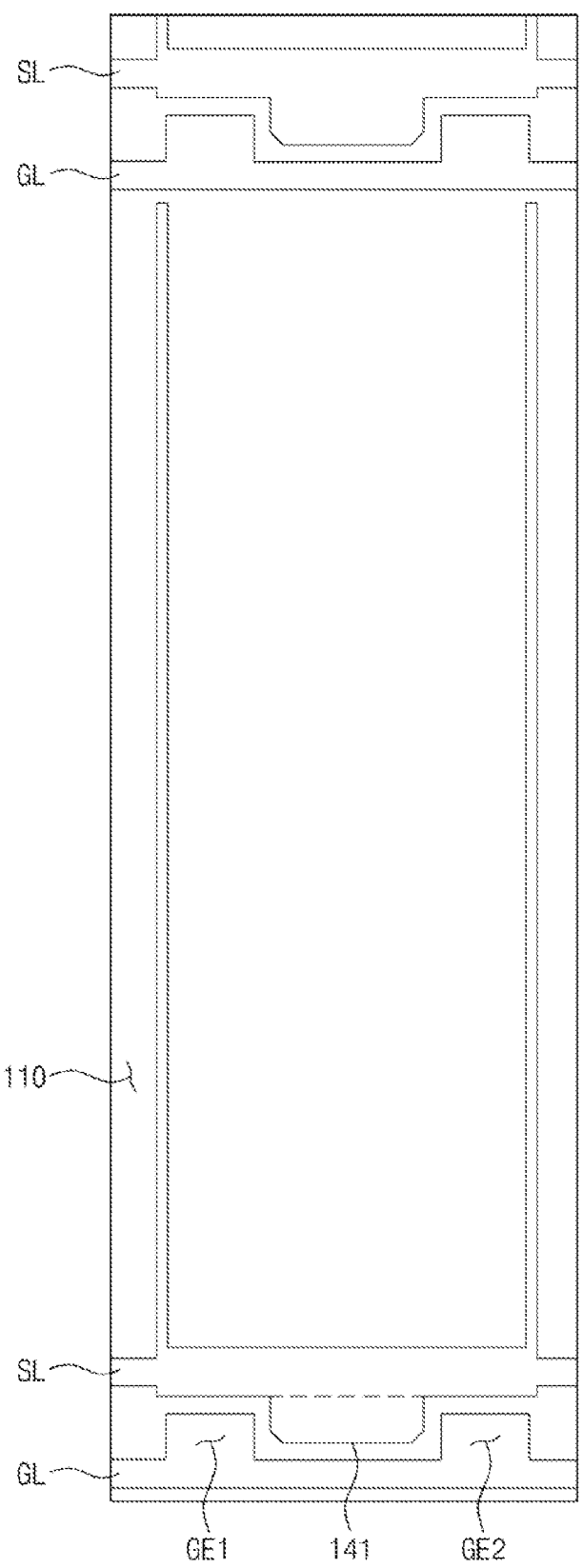
FIG. 3 is a plan view showing a storage line of FIG. 1.
Figure 4:
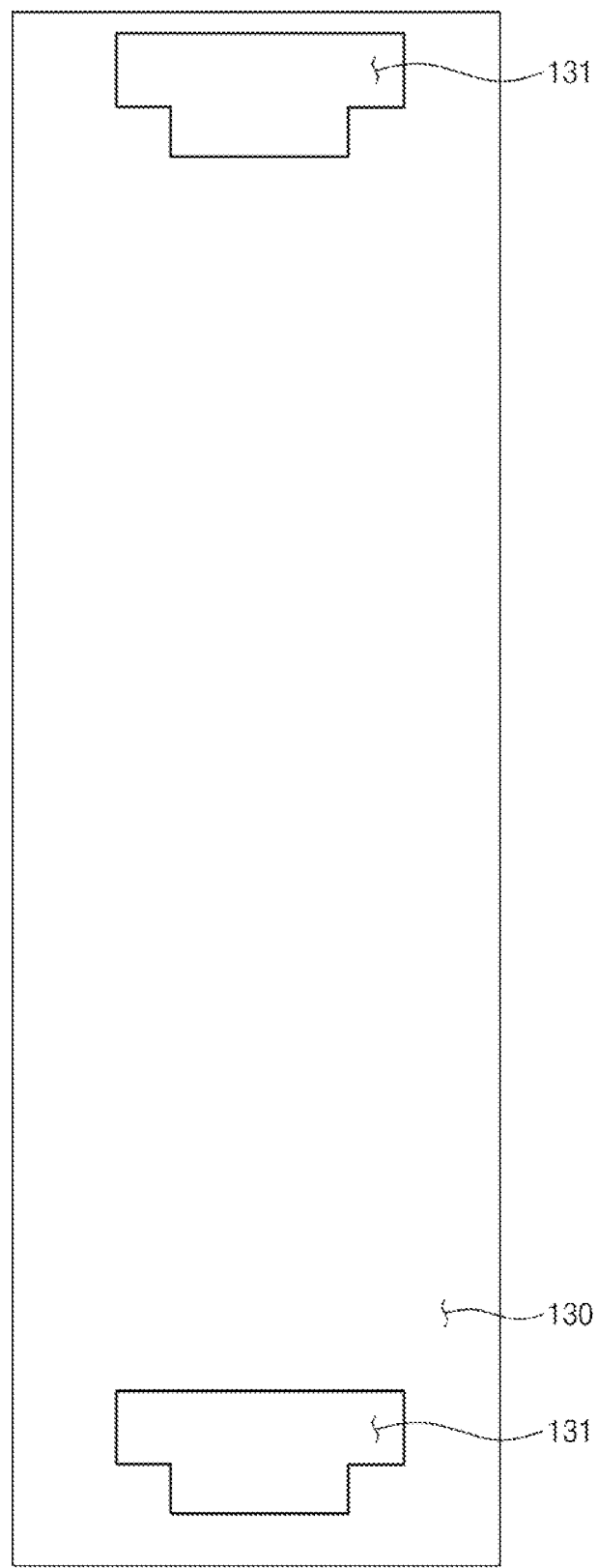
FIG. 4 is a plan view showing a protective layer of FIG. 2.

FIG. 3 is a plan view showing the first base substrate on which the gate line, the storage line, and the first and second gate electrodes are formed, and FIG. 4 is a plan view showing a protective layer illustrated in FIG. 2.

Referring to FIGS. 1 to 3, when the first base substrate 110 formed of a transparent material, such as glass or plastic, is prepared, a first metal material, for example, aluminum (Al), silver (Ag), copper (Cu), molybdenum (Mo), chromium (Cr), tantalum (Ta), titanium (Ti), etc., is formed on the first base substrate 110. The first metal material is patterned to form the gate line GL, the storage line SL, and the first and second gate electrodes GE1 and GE2 that are branched off from the gate line GL on the first base substrate 110.

Referring to FIG. 3, a protruding portion 141 that protrudes from the storage line SL toward the gate line GL is included in pixel PX. The protruding portion 141 is formed of the same first metal material as the storage line SL. The protruding portion 141 is arranged so that it is between the first and second gate electrodes GE1 and GE2. As a result, the length of a boundary between the storage line SL and the gate line GL may be increased by the protruding portion 141.

A gate insulating layer 120 is formed on the first base substrate 110 to cover the gate line GL, the storage line SL (including protruding portion 141), and the first and second gate electrodes GE1 and GE2. The gate insulating layer 120 may include silicon nitride (SiNx) or silicon oxide (SiOx).

Then, a second metal material, such as molybdenum (Mo), chromium (Cr), tantalum (Ta), titanium (Ti), etc., is formed on the gate insulating layer 120. The second metal material is patterned to form the first and second data lines DL1 and DL2, the first and second source electrodes SE1 and SE2, and the first and second drain electrodes DE1 and DE2.

Thus, the first thin film transistor Tr1 including the first gate electrode GE1, the first source electrode SE1, and the first drain electrode DE1 is formed on the first base substrate 110, and the second thin film transistor Tr2 including the second gate electrode GE2, the second source electrode SE2, and the second drain electrode DE2 is formed the first base substrate 110.

A protective layer 130 is formed on the gate insulating layer 120, the first and second thin film transistors Tr1 and Tr2, and the first and second data lines DL1 and DL2. The protective layer 130 may include an acrylic-based organic insulating material, for example, an acryl resin. As another exemplary embodiment, the protective layer 130 may include an inorganic insulating material, such as silicon oxide (SiOx) or silicon nitride (SiNx), or the protective layer 130 may be formed in a double-layered structure in which the inorganic insulating material and the organic insulating material are sequentially layered.

As shown in FIGS. 2 and 4, a first opening 131 is formed through the protective layer 130 to expose the gate insulating layer 120 in an area where the gate line GL and the storage line SL including protruding portion 141 are arranged adjacent to each other.

The first opening 131 may be overlapped with either the gate line GL or the protruding portion 141 of the storage line SL in the area where the gate line GL and the storage line SL are arranged adjacent to each other. In the present exemplary embodiment, the first opening 131 is provided to overlap the gate line GL, the storage line SL, and the protruding portion 141, but the first opening 131 may be overlapped with just the gate line GL or just the storage line SL.

When the first opening 131 is included, a direct-current electric field may be formed between the gate line GL and the storage line SL during operation of the display. When the time period that is required to display one image is set to one frame period (e.g., 16.7 ms), the gate signal applied to the gate line GL is in a high state during a portion (one horizontal scanning period of about 25 μs) of the one frame period, and the gate signal is in a low state during the remaining portion of the one frame period. As an example of the present exemplary embodiment, the gate signal has a voltage level of about −10 volts in the low period. The storage line SL receives a direct current voltage of about 0 volts to about 7 volts. Thus, the direct-current electric field that is uniformly maintained during the one frame period is formed between the storage line SL and the gate line GL.

In addition, the length of the boundary between the storage line SL and the gate line GL may be increased by the protruding portion 141 formed with the storage line SL. Therefore, an area where the direct-current electric field is formed may become larger due to the protruding portion 141.

When the direct-current electric field is formed between the storage line SL and the gate line GL as described above, impurity ions distributed in the liquid crystal layer 300 are gathered in the area where the direct-current electric field is formed. When the impurity ions are trapped in that area, a line-shaped after-image, which is due to movement of the impurity ions, may be prevented from being perceived between a black gray-scale area and a white gray-scale area.

The second substrate 200 includes a second base substrate 210 facing the first base substrate 110, and a black matrix 220 arranged on the second base substrate 210. The first base substrate 110 is divided into a display area and a non-display area, and the black matrix 220 is formed on the second base substrate 210 to correspond to the non-display area.

The first opening 131 is formed in a position that corresponds to an area in which the black matrix 220 is formed. Therefore, although the impurity ions are gathered in the area where the first opening 131 is formed by the direct-current electric field, the impurity ions are covered by the black matrix 220, thereby preventing the impurity ions from being perceived as a spot or defect in the display.

Also, the first opening 131 is overlapped with the first and second drain electrodes DE1 and DE2 and partially exposes the first and second drain electrodes DE1 and DE2 therethrough.

The first pixel electrode PE1 and the second pixel electrode PE2 are formed on the protective layer 130. The first and second pixel electrodes PE1 and PE2 may be formed of a transparent conductive material, such as, for example, indium tin oxide (ITO) or indium zinc oxide (IZO). In the present exemplary embodiment, the first pixel electrode PE1 and the second pixel electrode PE2 are formed on a same layer, however, the first and second pixel electrodes PE1 and PE2 may be formed on different layers from each other.

According to the above, as the first and second drain electrodes DE1 and DE2 are exposed through the first opening 131, the first pixel electrode PE1 is electrically connected to the first drain electrode DE1 through the first opening 131, and the second pixel electrode PE2 is electrically connected to the second drain electrode DE2 through the first opening 131.

Also, when viewed in a plan view, the first and second drain electrodes DE1 and DE2 may partially overlap the storage line SL. In this case, a distance d1 (FIG. 2) between the first drain electrode DE1 and the gate line GL is larger than a distance d2 between the storage line SL and the gate line GL. Similarly, a distance between the second drain electrode DE2 and the gate line GL is larger than a distance between the storage line SL and the gate line GL.

Thus, the direct-current electric field formed between the storage line SL and the gate line GL may be prevented from being decreased by the first and second drain electrodes DE1 and DE2.

Figure 5:
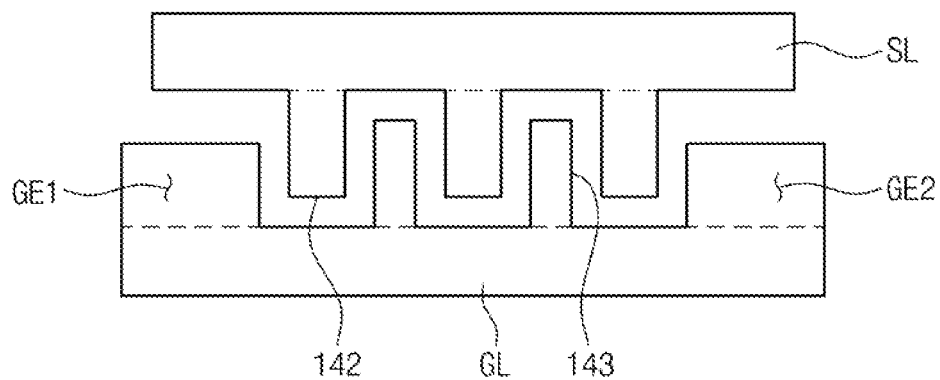
FIG. 5 is a plan view showing a storage line and a gate line according to another exemplary embodiment.

FIG. 5 is a plan view showing a storage line and a gate line according to another exemplary embodiment.

Referring to FIG. 5, a plurality of first protruding patterns 142 that protrude from the storage line SL are included in the pixel PX. The first protruding patterns 142 are protruded from the storage line SL toward the gate line GL and are spaced apart from each other with a predetermined distance. In the present exemplary embodiment, the first protruding patterns 142 are arranged between the first gate electrode GE1 and the second gate electrode GE2.

In addition, a plurality of second protruding patterns 143 that protrude from the gate line GL are also included in pixel PX. The second protruding patterns 143 are arranged between the first gate electrode GE1 and the second gate electrode GE2 and protrude from the gate line GL toward the storage line SL. The second protruding patterns 143 are spaced apart from each other with a predetermined distance, and each of the second protruding patterns 143 is arranged between two adjacent first protruding patterns 142 so that the first and second protruding patterns 142 and 143 are alternately arranged.

As a result, when the first and second protruding patterns 142 and 143 are alternately arranged, the overall length of the boundary between the storage line SL and the gate line GL increases. Thus, the area in which a direct-current electric field is formed between the storage line SL and the gate line GL may be increased.

Figure 6:
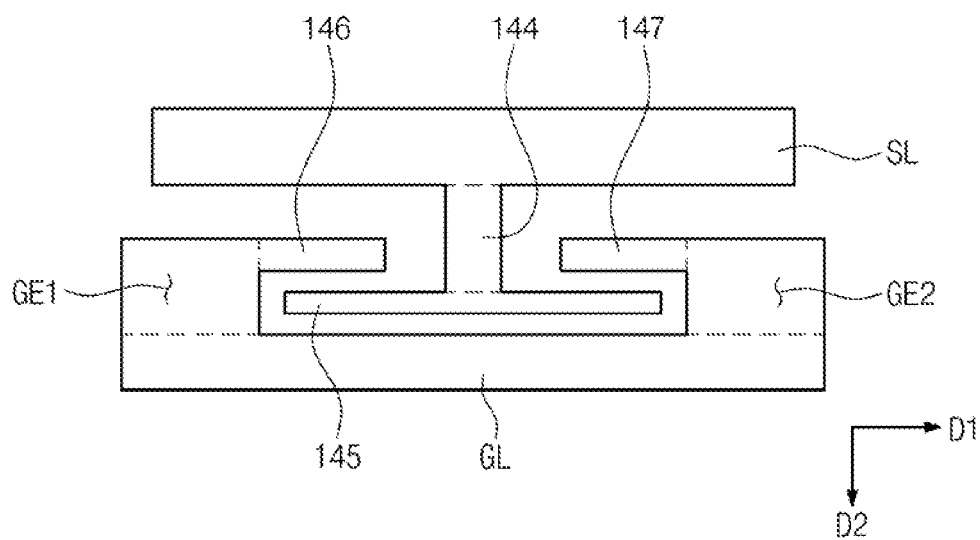
FIG. 6 is a plan view showing a storage line and a gate line according to another exemplary embodiment.

FIG. 6 is a plan view showing a storage line and a gate line according to another exemplary embodiment.

Referring to FIG. 6, a third protruding pattern 144 that protrudes from the storage line SL in the second direction D2 and a fourth protruding pattern 145 that protrudes from the third protruding pattern 144 and extends in the first direction D1 are included in pixel PX. The third and fourth protruding patterns 144 and 145 are arranged between the first gate electrode GE1 and the second gate electrode GE2.

The gate line GL includes a fifth protruding pattern 146 that protrudes from the first gate electrode GE1, and a sixth protruding pattern 147 that protrudes from the second gate electrode GE2. The fifth protruding pattern 146 is arranged between the storage line SL and the fourth protruding pattern 145, and the sixth protruding pattern 147 is arranged between the storage line SL and the fourth protruding pattern 145.

The overall length of the boundary between the storage line SL and the gate line GL is increased by the third to sixth protruding patterns 144 to 147 formed between the storage line SL and the gate line GL. Thus, an area in which a direct-current electric field is formed between the storage line SL and the gate line GL may be increased.

Each of the protruding patterns formed with the storage line SL and the gate line GL may have different shapes form the shapes shown in FIGS. 5 and 6.

Figure 7:
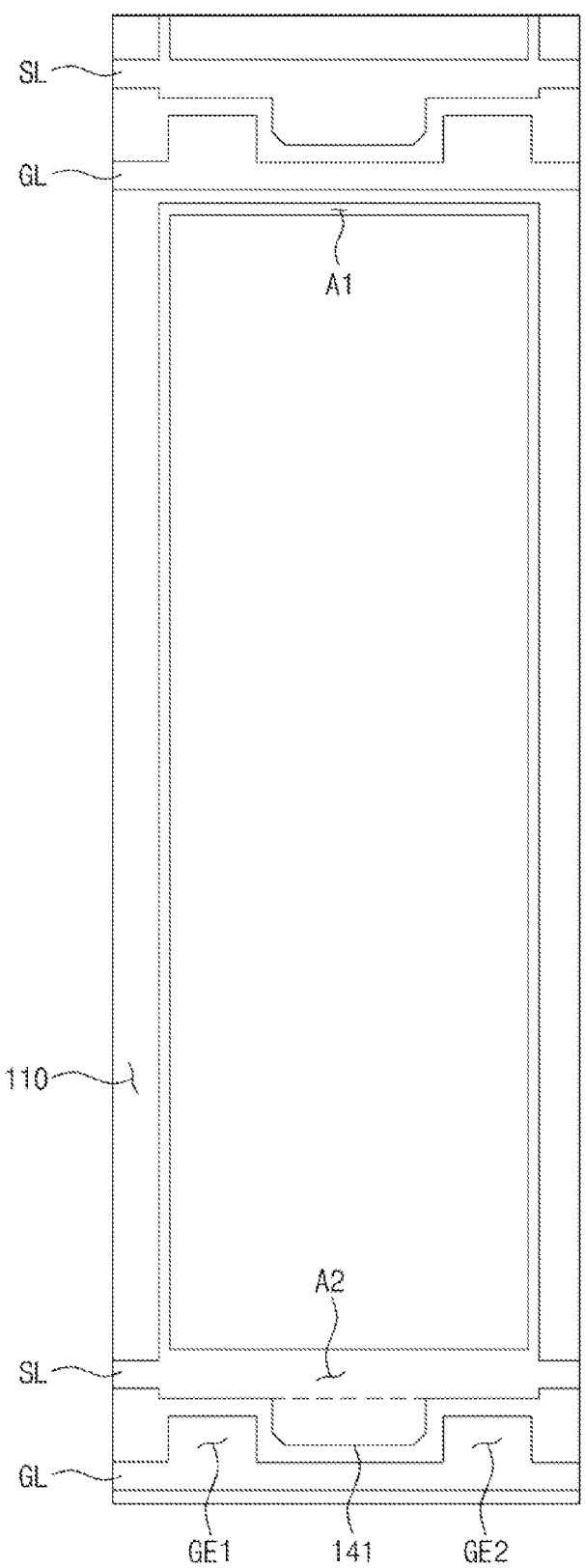
FIG. 7 is a plan view showing a storage line according to another exemplary embodiment.

FIG. 7 is a plan view showing a storage line according to another exemplary embodiment.

Referring to FIG. 7, a storage line SL has a closed loop shape. Also, the storage line SL has at least two portions A1 and A2 that are arranged substantially in parallel to the gate line GL. In addition, the storage line SL further includes a protruding portion 141 that protrudes from at least one portion, e.g., A2, of the two portions A1 and A2 toward the gate line GL, and which is arranged between the first gate electrode GE1 and the second gate electrode GE2.

Figure 8:
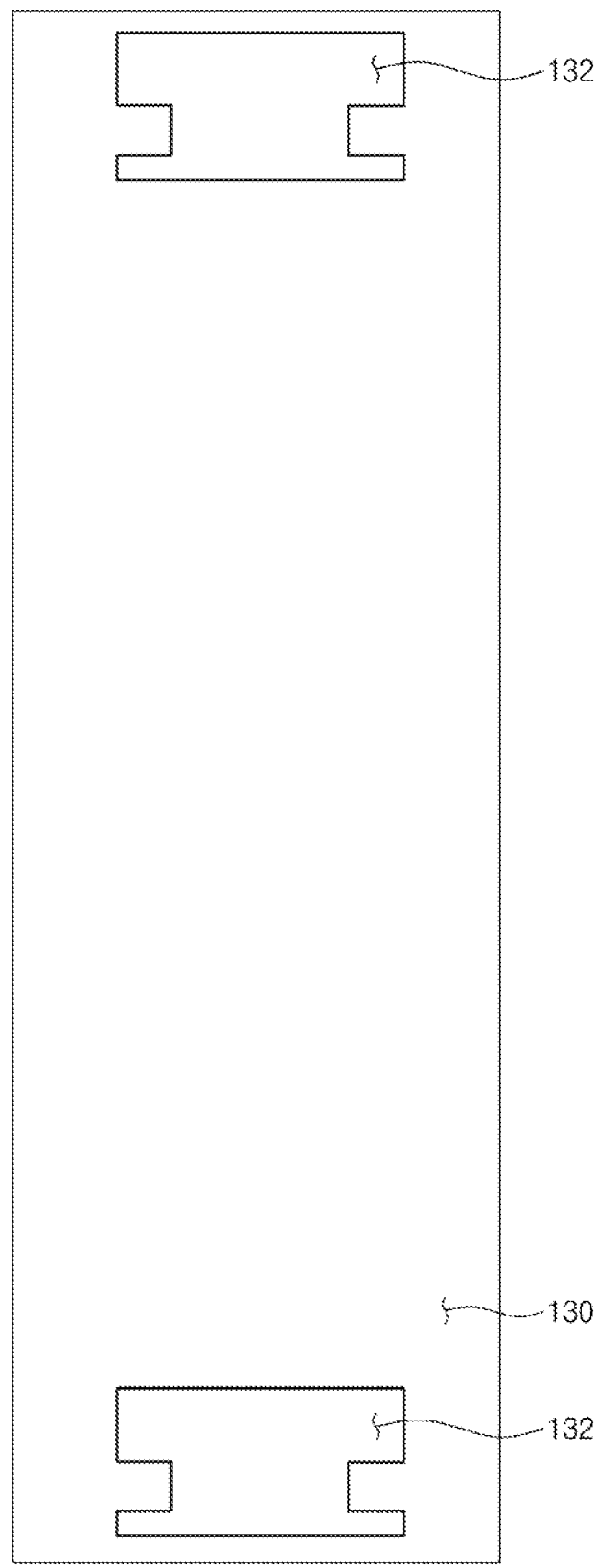
FIG. 8 is a plan view showing a protective layer disposed on a storage line of FIG. 7.
Figure 9:
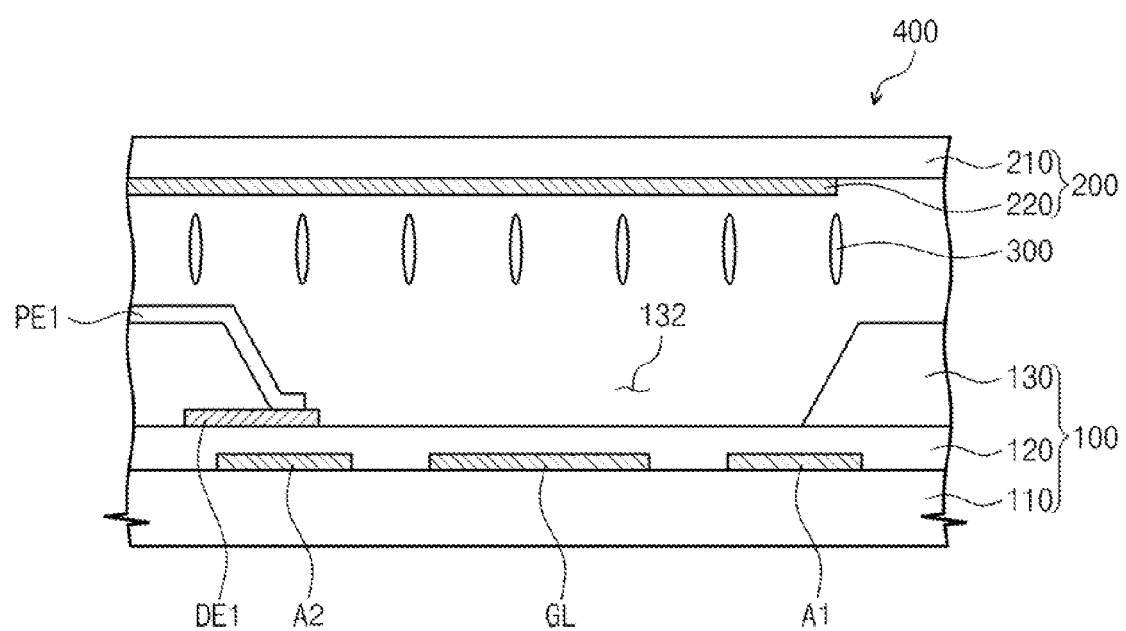
FIG. 9 is a cross-sectional view showing a liquid crystal display including a storage line and a protective layer of FIGS. 7 and 8.

FIG. 8 is a plan view showing the protective layer disposed on the storage line of FIG. 7, and FIG. 9 is a cross-sectional view showing a liquid crystal display including the storage line and a protective layer of FIGS. 7 and 8 taken along the same line, I-I', as illustrated in FIG. 1.

Referring to FIGS. 8 and 9, the protective layer 130 is provided with a first opening 132 formed through the protective layer and overlapped with the gate line GL and the storage line SL. In particular, the first opening 132 is overlapped with the gate line GL, the two portions A1 and A2 of the storage line SL, and the protruding portion 141.

As described above, the storage line SL is adjacent to the gate line GL in the two portions A1 and A2. Thus, the overall length of the boundary between the storage line SL and the gate line GL is increased in the pixel PX, and thus the area where the direct-current electric field is formed between the storage line SL and the gate line GL may be increased.

Figure 10A:
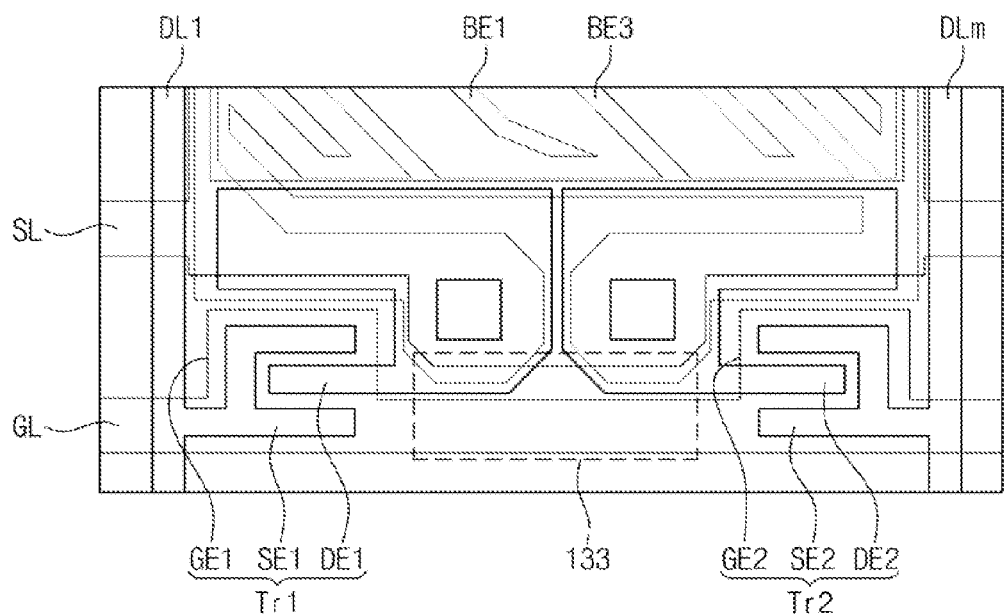
FIG. 10A and FIG. 10B are plan views showing an opening of a protective layer according to another exemplary embodiment.

FIG. 10A is a plan view showing an opening of a protective layer according to another exemplary embodiment.

Referring to FIG. 10A, a protective layer 130 (shown in FIG. 9) is provided with a first opening 133 that is overlapped with the gate line GL and the protruding portion 141 of the storage line SL. In this case, the first drain electrode DE1 and the second drain electrode DE2 are not exposed through the first opening 133. Thus, a first contact hole and a second contact hole (not shown) may be further formed through the protective layer 130 to expose the first and second drain electrodes DE1 and DE2, respectively. Then, the first pixel electrode PE1 is connected to the first drain electrode DE1 through the first contact hole, and the second pixel electrode PE2 is connected to the second drain electrode DE2 through the second contact hole.

Figure 10B:
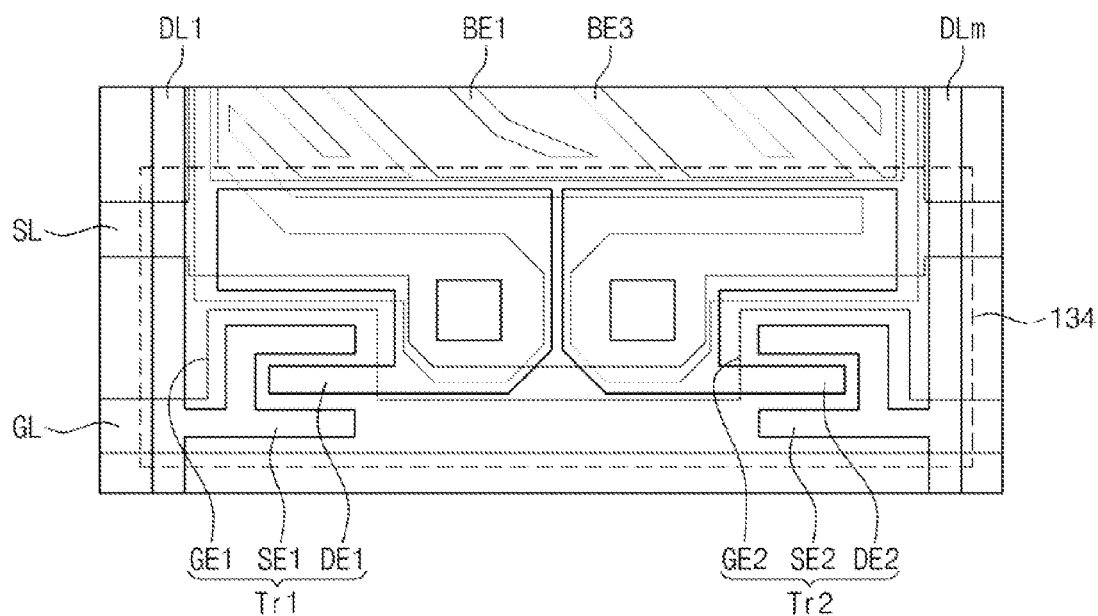

FIG. 10B is a plan view showing an opening of a protective layer according to another exemplary embodiment.

In Another exemplary embodiment is illustrated in FIG. 10B, in which the protective layer 130 may be provided with a first opening 134 that overlaps with the gate line GL, the storage line SL, and the first and second thin film transistors Tr1 and Tr2. In this case, the first source electrode SE1 and the first drain electrode DE1 of the first thin film transistor Tr1 may be exposed through the first opening 134, and the second source electrode SE2 and the second drain electrode DE2 of the second thin film transistor Tr2 may be exposed through the first opening 134. Therefore, the first and second pixel electrodes PE1 and PE2 arranged on the protective layer 130 may be connected to the first and second drain electrodes DE1 and DE2, respectively, through the first opening 134.

Figure 11:
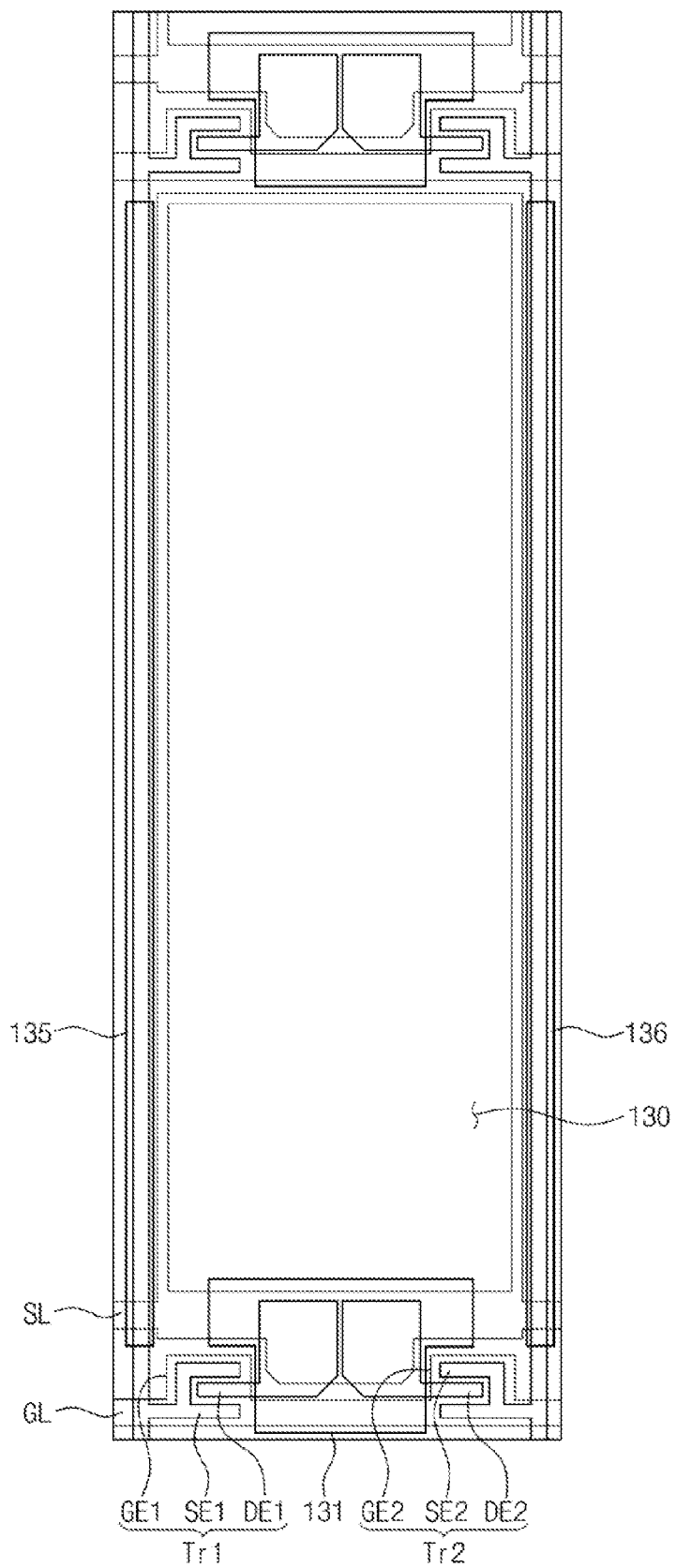
FIG. 11 is a plan view showing a protective layer according to another exemplary embodiment.

FIG. 11 is a plan view showing a protective layer according to another exemplary embodiment.

Referring to FIG. 11, the gate line GL, the storage line SL, and the first and second gate electrodes GE1 and GE2 branched off from the gate line GL are formed on the first base substrate 110.

The storage line SL includes the protruding portion 141 that protrudes toward the gate line GL and is arranged between the first gate electrode GE1 and the second gate electrode GE2. The length of the boundary between the storage line SL and the gate line GL may be increased due to the protruding portion 141.

The protective layer 130 is provided with a first opening 131, a second opening 135, and a third opening 136. The first opening 131 overlaps with the storage line SL, the protruding portion 141, and the gate line GL. The second opening 135 overlaps with the first data line DL1, and the third opening 136 overlaps with the second data line DL2. The second and third openings 135 and 136 may be formed along a direction in which the first and second data lines DL1 and DL2 are extended.

When the first opening 131 is formed through the protective layer 130, the direct-current electric field formed between the storage line SL and the gate line GL may be increased. Thus, impurity ions that move in a certain direction may be trapped by the direct-current electric field within an area of the display in which the black matrix 220 is formed.

In addition, when the second and third openings 135 and 136 are formed along the direction in which the first and second data lines DL1 and DL2 are extended, the mobility of the impurity ions that move in the first direction D1 may be reduced by the second and third openings 135 and 136. Therefore, line-shaped after-images that occur between the black grayscale area and the white grayscale area due to the differences in the mobility of the impurity ions may be reduced.

Figure 12:
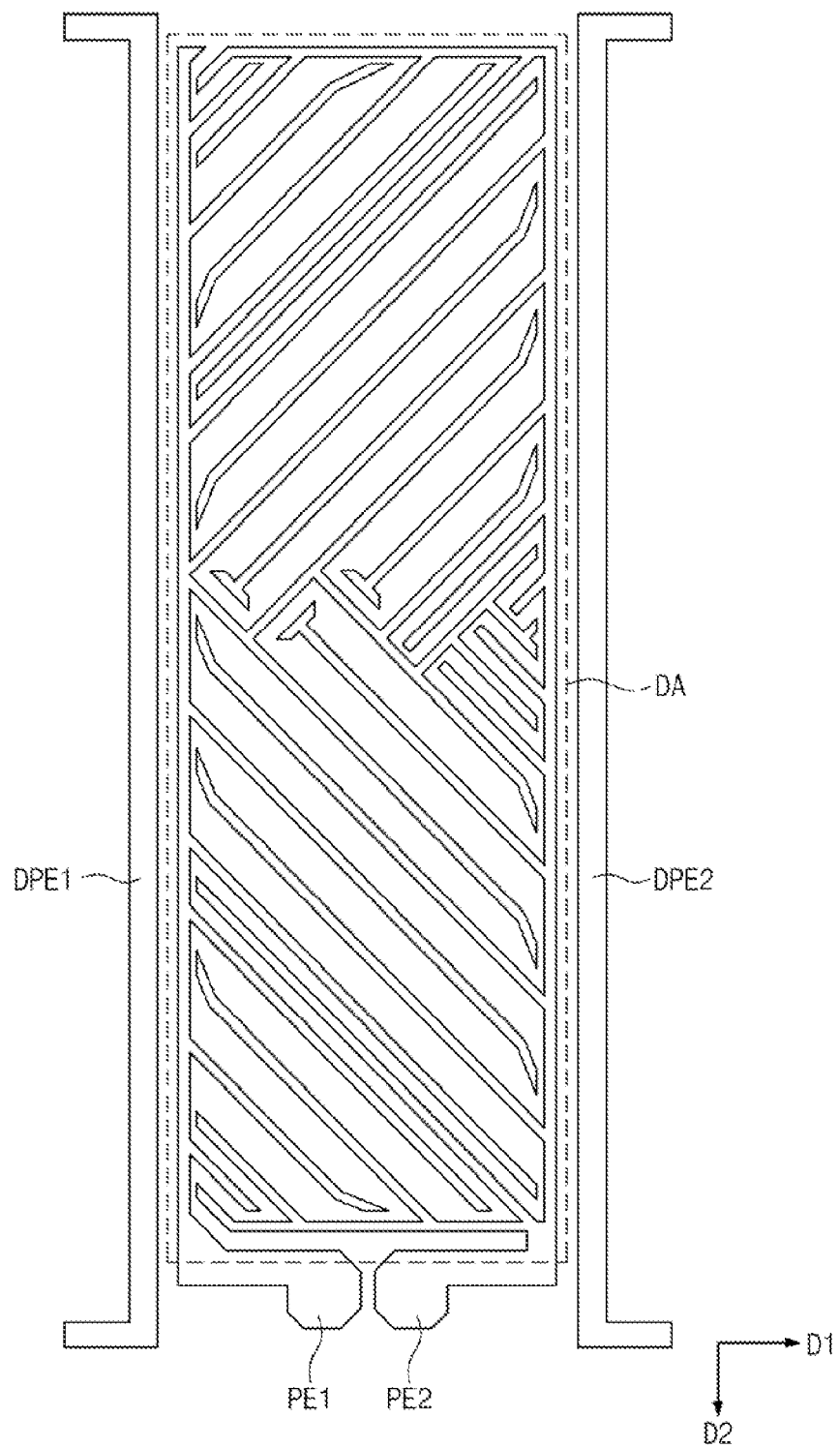
FIG. 12 is a plan view showing a first pixel electrode, a second pixel electrode, a first dummy pixel electrode, and a second dummy pixel electrode according to another exemplary embodiment.

FIG. 12 is a plan view showing a first pixel electrode, a second pixel electrode, a first dummy pixel electrode, and a second dummy pixel electrode according to another exemplary embodiment.

Referring to FIG. 12, the first substrate 100 is divided into the display area DA displaying an image and the non-display area surrounding the display area DA. A first pixel electrode PE1 and a second pixel electrode PE2 are arranged on the protective layer 130 corresponding to the display area DA. The first pixel electrode PE1 and the second pixel electrode PE2 are insulated from each other and are spaced apart from each other. Because the first and second pixel electrodes PE1 and PE2 have the same structure and function as the first and second pixel electrodes of FIG. 1, detailed descriptions of the first and second pixel electrodes PE1 and PE2 will be omitted.

A first dummy pixel electrode DPE1 and a second dummy pixel electrode DPE2 are arranged on the area of the protective layer 130 that corresponds to the non-display area. The first and second dummy pixel electrodes DPE1 and DPE2 may include a transparent conductive material, such as ITO or IZO, similar to the first and second pixel electrodes PE1 and PE2.

Each of the first and second dummy pixel electrodes DPE1 and DPE2 is spaced apart from the first and second pixel electrodes PE1 and PE2 so as to be insulated from the first and second pixel electrodes PE1 and PE2. The first dummy pixel electrode DPE1 is arranged adjacent to the first data line DL1, and the second dummy pixel electrode DPE2 is arranged adjacent to the second data line DL2. In addition, the first and second dummy pixel electrodes DPE1 and DPE2 may extend in a direction that is substantially parallel to the first and second data lines DL1 and DL2.

The first and second dummy pixel electrodes DPE1 and DPE2 may receive a direct-current voltage. For example, the direct-current voltage may be the common voltage that is applied to the storage line SL. Then, the first and second dummy pixel electrodes DPE1 and DPE2 may be electrically connected to the storage line SL.

Alternatively, the first and second dummy pixel electrodes DPE1 and DPE2 may be in a floating state in which no voltage is applied to the first and second dummy pixel electrodes DPE1 and DPE2.

When the first and second dummy pixel electrodes DPE1 and DPE2 are formed in the second direction D2 that is substantially parallel to the first and second data lines DL1 and DL2, the mobility of the impurity ions that move in the first direction D1 may be decreased. Thus, line-shaped after-images that occur between the black grayscale area and the white grayscale area due to differences in the mobility of the impurity ions may be prevented.

Although not shown in FIG. 12, the first and second dummy pixel electrodes DPE1 and DPE2 are formed in the non-display area in which the black matrix 220 (shown in FIG. 2) is formed. Thus, the impurity ions trapped by the first and second dummy pixel electrodes DPE1 and DPE2 may be prevented from being perceived as a spot or defect in the display.

Figure 13:
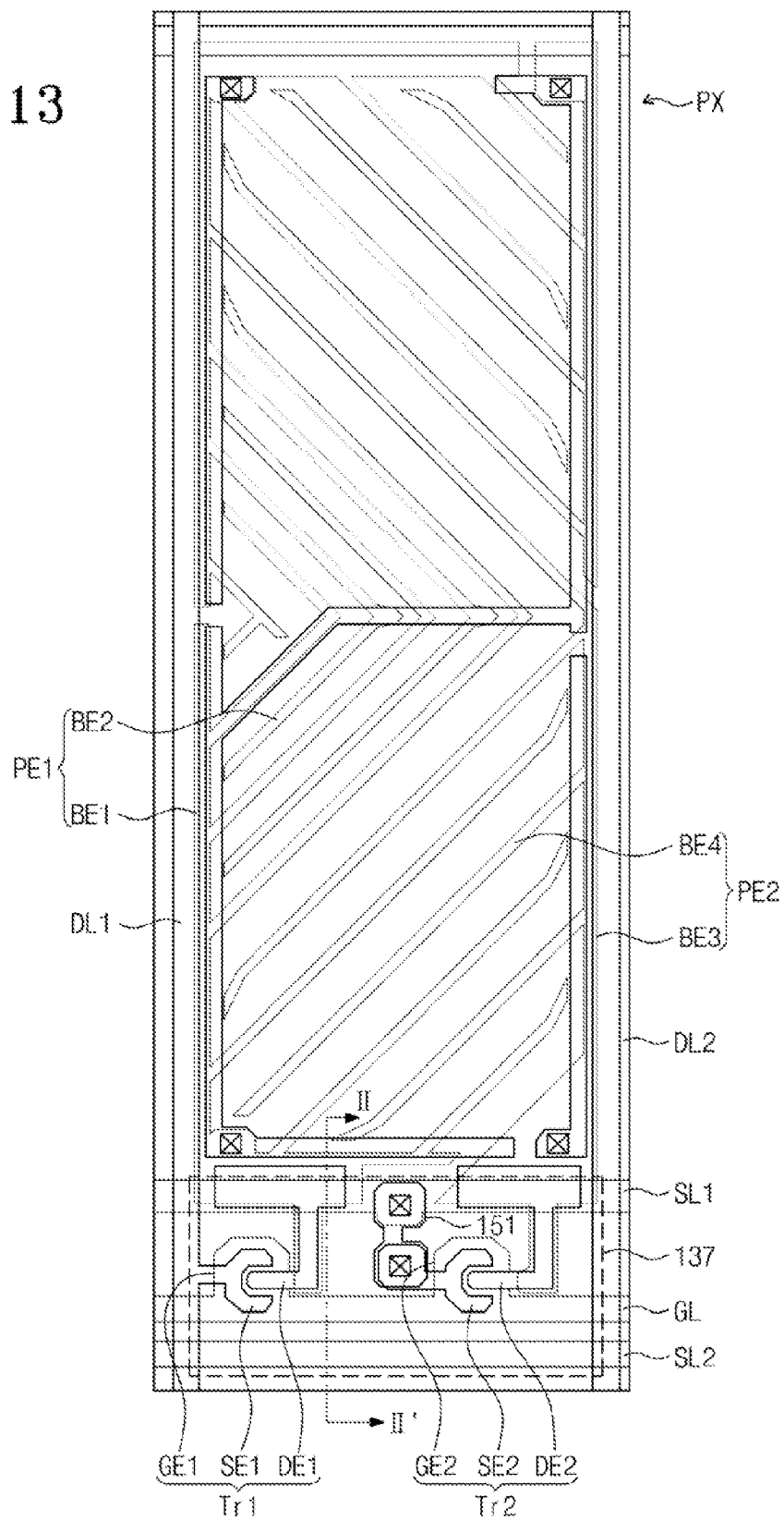
FIG. 13 is a plan view showing a liquid crystal display according to another exemplary embodiment.
Figure 14:
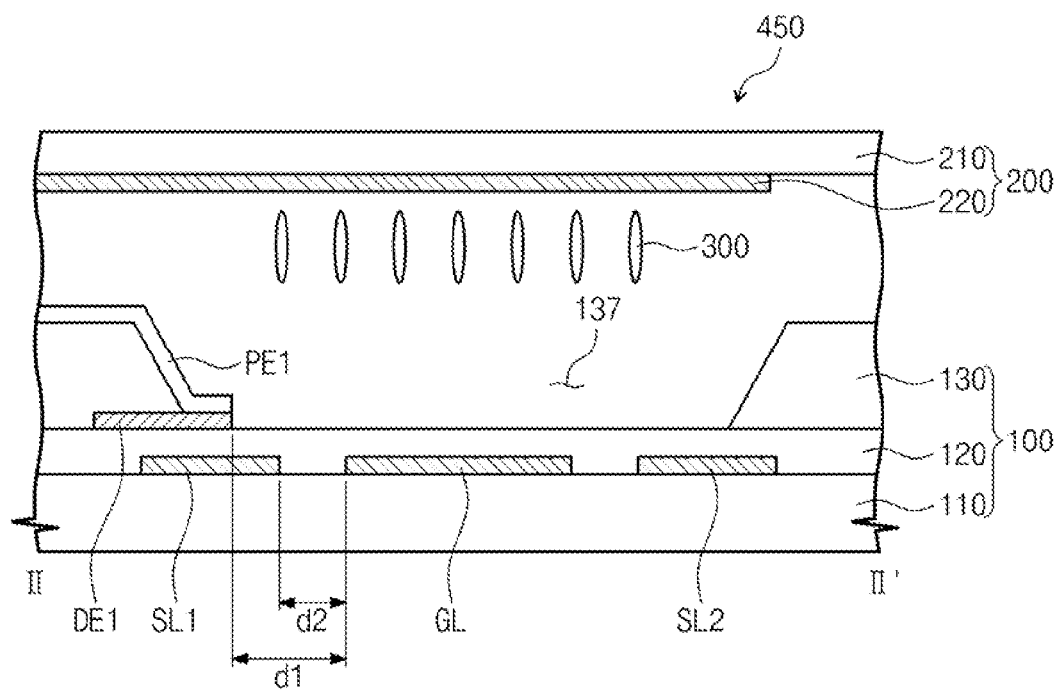
FIG. 14 is a cross-sectional view taken along a line II-II' of FIG. 13.

FIG. 13 is a plan view showing a liquid crystal display according to another exemplary embodiment, and FIG. 14 is a cross-sectional view taken along a line II-II' of FIG. 13. In FIGS. 13 and 14, the same reference numerals denote the same elements as in FIGS. 1 and 2, thus detailed descriptions of the same elements will be omitted.

Also, the liquid crystal display includes a plurality of pixels, but for convenience of explanation, just one of the pixels will be described in detail in FIGS. 13 and 14 as all of the pixels have the same structure and function, and thus detailed descriptions of others will be omitted.

Referring to FIGS. 13 and 14, a liquid crystal display 450 includes a first substrate 100 on which a pixel PX is arranged, a second substrate 200 coupled to the first substrate 100 and facing the first substrate 100, and a liquid crystal layer 300 interposed between the first substrate 100 and the second substrate 200.

The first substrate 100 includes a first base substrate 110, and the pixel PX is arranged on the first base substrate 110. The pixel PX includes at least one gate line GL extending in a first direction D1, a first data line DL1 extending in a second direction D2 that is substantially perpendicular to the first direction D1, and a second data line DL2 that is substantially parallel to the first data line DL1. The gate line GL receives a gate signal. As an example, the gate signal may be maintained at a voltage level of about −7 volts during a low period.

In addition, the pixel PX includes a first storage line SL1 and a second storage line SL2 that are spaced apart from the gate line GL in a plan view. The gate line GL is arranged between the first storage line SL1 and the second storage line SL2. Also, the first and second storage lines SL1 and SL2 receive different voltages from each other. As an example, when the first storage line SL1 receives a first voltage of about 0 volts, the second storage line SL2 may receive a second voltage of about 15 volts. In this case, the first and second data lines DL1 and DL2 may receive a data voltage having a voltage level of about 0 volts to about 15 volts.

A first thin film transistor Tr1, a second thin film transistor Tr2, a first pixel electrode PE1, and a second pixel electrode PE2 are also included in pixel PX.

The first thin film transistor Tr1 includes a first gate electrode GE1 that is branched off from the gate line GL, a first source electrode SE1 that is branched off from the first data line DL1, and a first drain electrode DE1 electrically connected to the first pixel electrode PE1. The second thin film transistor Tr2 includes a second gate electrode GE2 that is branched off from the gate line GL, a second source electrode SE2 electrically connected to the first storage line SL1, and a second drain electrode DE2 electrically connected to the second pixel electrode PE2. The first storage line SL1 and the second source electrode SE2 may be electrically connected to each other through a bridge electrode 151.

Thus, the first and second thin film transistors Tr1 and Tr2 are substantially simultaneously turned on in response to the gate signal applied to gate line GL. The turned-on first thin film transistor Tr1 transmits the data voltage, which it received from the first data line DL1, to the first pixel electrode PE1. In addition, the turned-on second thin film transistor Tr2 transmits the first voltage, which it received from the first storage line SL1, to the second pixel electrode PE2.

The first pixel electrode PE1 includes a first base electrode BE1 and a plurality of first branch electrodes BE2 that are branched off from the first base electrode BE1. The first base electrode BE1 may include both a portion that is substantially parallel to the direction D1 in which the gate line GL extends and a portion that is substantially parallel to the direction D2 in which the first and second data lines DL1 and DL2 extend. The first branch electrodes BE2 are spaced apart from each other with a predetermined distance. Also, the first branch electrodes BE2 may be inclinedly extended at a predetermined angle with respect to the gate line GL. Some of the first branch electrodes BE2 may have a V-shape. In addition, the first pixel electrode PE1 is partially overlapped with the first drain electrode DE1 in a plan view.

The second pixel electrode PE2 includes a second base electrode BE3 that is insulated from the first base electrode BE1, and a plurality of second branch electrodes BE4 that branch off from the second base electrode BE3. The second base electrode BE3 may include both a portion that is substantially parallel to the first direction D1 in which the gate line GL extends and a portion that is substantially parallel to the second direction D2 in which the first and second data lines DL1 and DL2 extend. The second branch electrodes BE4 are spaced apart from each other with a predetermined distance. The second branch electrodes BE4 have a similar structure to that of the first branch electrodes BE2. Also, each of the second branch electrodes BE4 is arranged between two first branch electrodes BE2 adjacent to each other. Thus, the first and second branch electrodes BE2 and BE4 are alternately arranged in an area where the pixel PX is formed. The second pixel electrode PE2 is partially overlapped with the second drain electrode DE2 in a plan view.

Because the first pixel electrode PE1 receives the data voltage and the second pixel electrode PE2 receives the second voltage, an electric field is formed on the first substrate 100 along a direction that is substantially parallel to an upper surface of the first base substrate 110, i.e. a horizontal direction, by the first and second pixel electrodes PE1 and PE2.

The liquid crystal layer 300 includes liquid crystal molecules that are vertically aligned (that is, approximately perpendicular) with respect to the upper surface of the first base substrate 110 when no electric-field is applied to the liquid crystal layer 300 (OFF state). When the electric field is formed between the first and second pixel electrodes PE1 and PE2, the liquid crystal molecules may be horizontally aligned by the electric field.

Referring to FIG. 14, a protective layer 130 is provided with a first opening 137 that is formed through the protective layer 130 in an area that overlaps an area where the gate line GL and the first storage line SL1 are adjacent to each other and an area where the gate line GL and the second storage line SL2 are adjacent to each other. In particular, the first opening 137 is overlapped with the gate line GL, the first storage line SL1, and the second storage line SL2.

When the first opening 137 is formed as described, during operation of the display a direct-current electric field is formed between the gate line GL and the first storage line SL1, and also between the gate line GL and the second storage line SL2. When the time period that is required to display one image is set to one frame period (e.g., 16.7 ms), the gate signal applied to the gate line GL is maintained at a high state during a portion (one horizontal scanning period, e.g., 25 µs) of the one frame period, and the gate signal is maintained at a low state during the remaining portion of the one frame period. As an exemplary embodiment, the gate signal has a voltage level of about −7 volts during the low period. The first storage line SL1 receives a direct-current voltage having a voltage level of about 0 volts or a direct-current voltage having a voltage level of about 15 volts, and the second storage line SL2 receives a remaining direct-current voltage of the direct-current voltage having the voltage level of about 0 volts or the direct-current voltage having the voltage level of about 15 volts. Therefore, during most of the time in the one frame period, a direct-current electric field having a constant level is formed between the first storage line SL1 and the gate line GL.

As described above, a direct-current electric field is formed between the gate line GL and the first storage line SL1, and impurity ions distributed within the liquid crystal layer 300 are gathered in an area where the direct-current electric field is formed. Thus, the impurity ions are trapped in an area where the first opening 137 is formed, thereby preventing the line-shaped after-image caused by the movement of the impurity ions from being perceived between a black grayscale area and a white grayscale area.

The second substrate 200 includes a second base substrate 210 facing the first base substrate 110, and a black matrix 220 arranged on the second base substrate 210. The first base substrate 110 is divided into a display area and a non-display area, and the black matrix 220 is formed on the area corresponding to the non-display area.

The first opening 137 is arranged in an area that corresponds to an area where the black matrix 220 is formed. Thus, although the impurity ions are gathered in the area where the first opening 137 is formed by the direct-current electric field, the impurity ions may be prevented from being perceived as a spot because the area in which the impurity ions are gathered is covered by the black matrix 220.

In addition, the first opening 137 is overlapped with the first and second drain electrodes DE1 and DE2 to partially expose the first and second drain electrodes DE1 and DE2.

Therefore, the first pixel electrode PE1 is electrically connected to the first drain electrode DE1 through the first opening 137, and the second pixel electrode PE2 is electrically connected to the second drain electrode DE2 through the first opening 137.

When viewed in a plan view, the first and second drain electrodes DE1 and DE2 may partially overlap with the first storage line SL1. Then, a distance d1 between the first drain electrode DE1 and the gate line GL is larger than a distance d2 between the first storage line SL1 and the gate line GL. Accordingly, the direct-current electric field formed between the first storage line SL1 and the gate line GL may be prevented from being decreased by the first and second drain electrodes DE1 and DE2.

Figure 15:
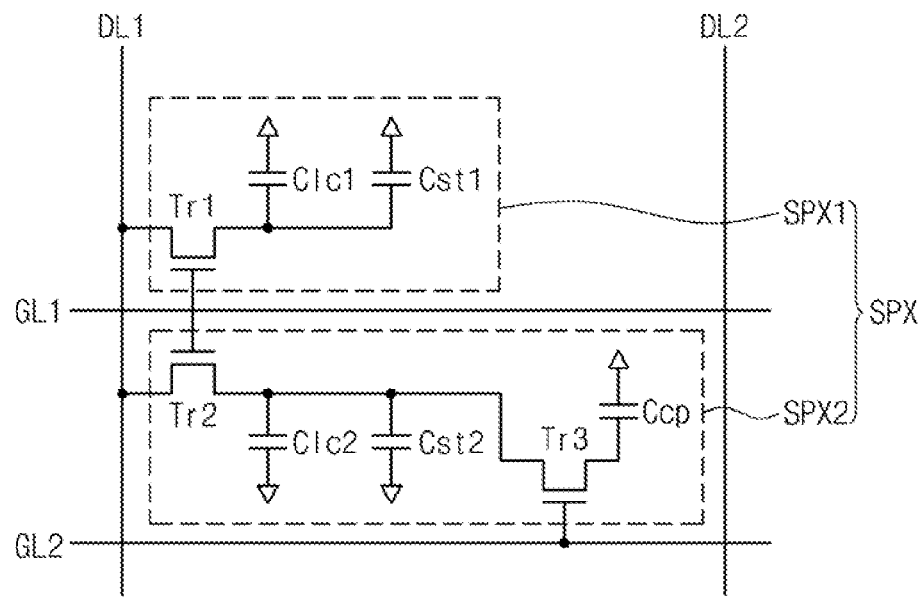
FIG. 15 is an equivalent circuit diagram showing a liquid crystal display according to another exemplary embodiment.

FIG. 15 is an equivalent circuit diagram showing a liquid crystal display according to another exemplary embodiment. In the present exemplary embodiment, a liquid crystal display includes a plurality of pixels. However, as all of the pixels have the same structure and function, just one pixel will be described in detail in FIG. 15, and thus detailed descriptions of others will be omitted.

Referring to FIG. 15, a pixel PX includes a first sub-pixel SPX1 and a second sub-pixel SPX2. The first sub-pixel SPX1 includes a first thin film transistor Tr1, a first liquid crystal capacitor Clc1, and a first storage capacitor Cst1. The second sub-pixel SPX2 includes a second thin film transistor Tr2, a second liquid crystal capacitor Clc2, a second storage capacitor Cst2, a third thin film transistor Tr3, and a coupling capacitor Ccp. The first and second sub-pixels SPX1 and SPX2 are arranged between a first data line DL1 and a second data line DL2 that are adjacent to each other.

Also, the first thin film transistor Tr1 of the first sub-pixel SPX1 is connected to the first data line DL1 and a first gate line GL1. The second thin film transistor Tr2 of the second sub-pixel SPX2 is connected to the first data line DL1 and the first gate line GL1.

In particular, the first thin film transistor Tr1 includes a first source electrode connected to the first data line DL1, a first gate electrode connected to the first gate line GL1, and a first drain electrode connected to the first liquid crystal capacitor Clc1. The first storage capacitor Cst1 is connected in parallel to the first liquid crystal capacitor Clc1. The second thin film transistor Tr2 includes a second source electrode connected to the first data line DL1, a second gate electrode connected to the first gate line GL1, and a second drain electrode connected to the second liquid crystal capacitor Clc2. The second storage capacitor Cst2 is connected in parallel to the second liquid crystal capacitor Clc2.

When a first gate signal is applied to the first gate line GL1, the first and second thin film transistors Tr1 and Tr2 are turned on substantially simultaneously. A data voltage applied to the first data line DL1 is applied to the first and second liquid crystal capacitors Clc1 and Clc2 through the turned-on first and second thin film transistors Tr1 and Tr2, respectively. Thus, the first and second liquid crystal capacitors Clc1 and Clc2 are charged with a pixel voltage having the same voltage level during a high period of the first gate signal.

The third thin film transistor Tr3 includes a third source electrode connected to the second drain electrode of the second thin film transistor Tr2, a third gate electrode connected to a second gate line GL2, and a third drain electrode connected to the coupling capacitor Ccp. The second gate line GL2 receives a second gate signal that rises after the first gate signal falls. When the third thin film transistor Tr3 is turned on in response to the second gate signal, the pixel voltage charged to the second liquid crystal capacitor Clc2 is lowered by the coupling capacitor Ccp.

As a result, after the second gate signal is generated, the first liquid crystal capacitor Clc1 is charged with a first pixel voltage, and the second liquid crystal capacitor Clc2 is charged with a second pixel voltage having a voltage level that is lower than the first pixel voltage.

Figure 16:
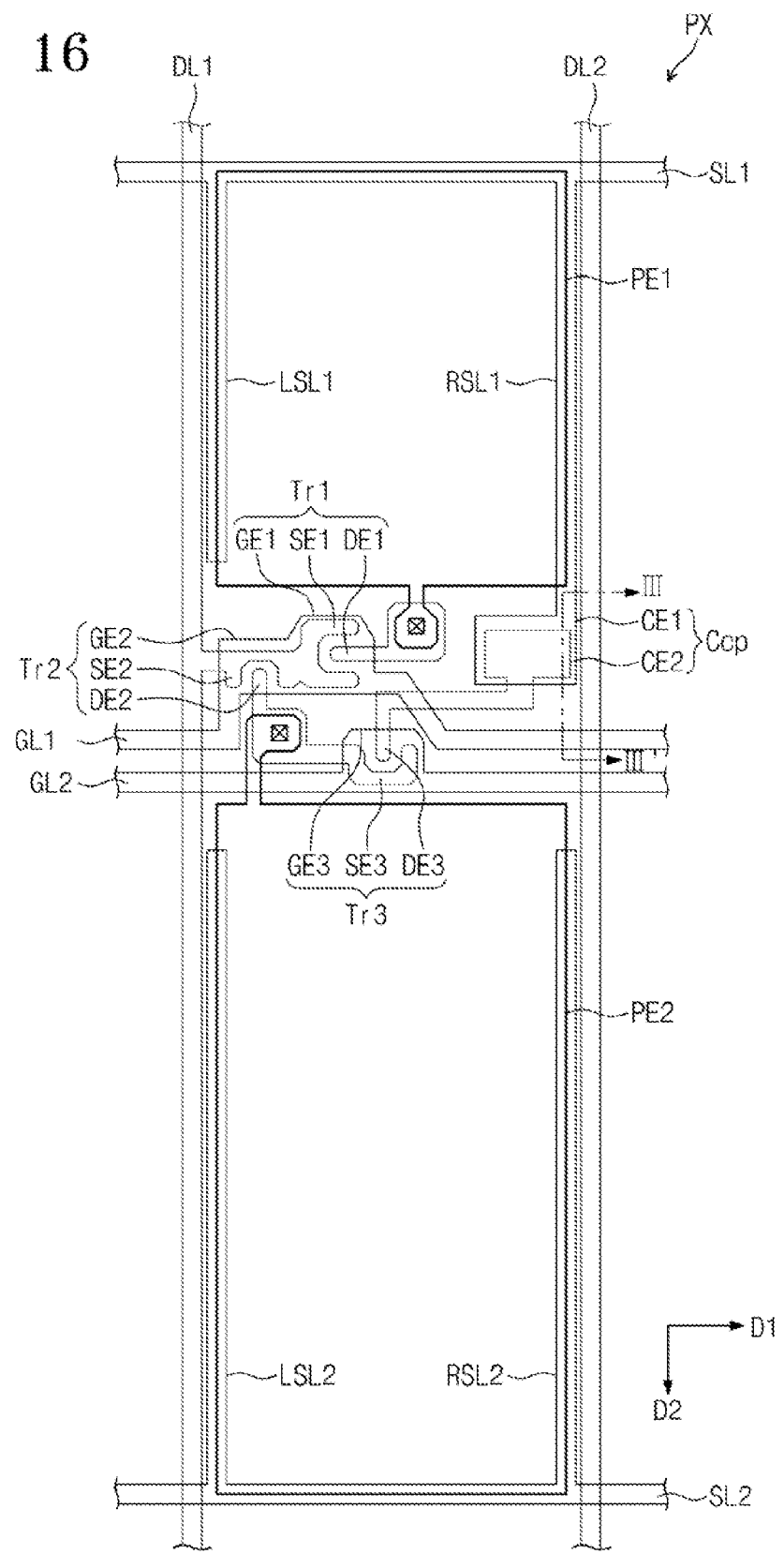
FIG. 16 is a layout showing a pixel of FIG. 15.
Figure 17:
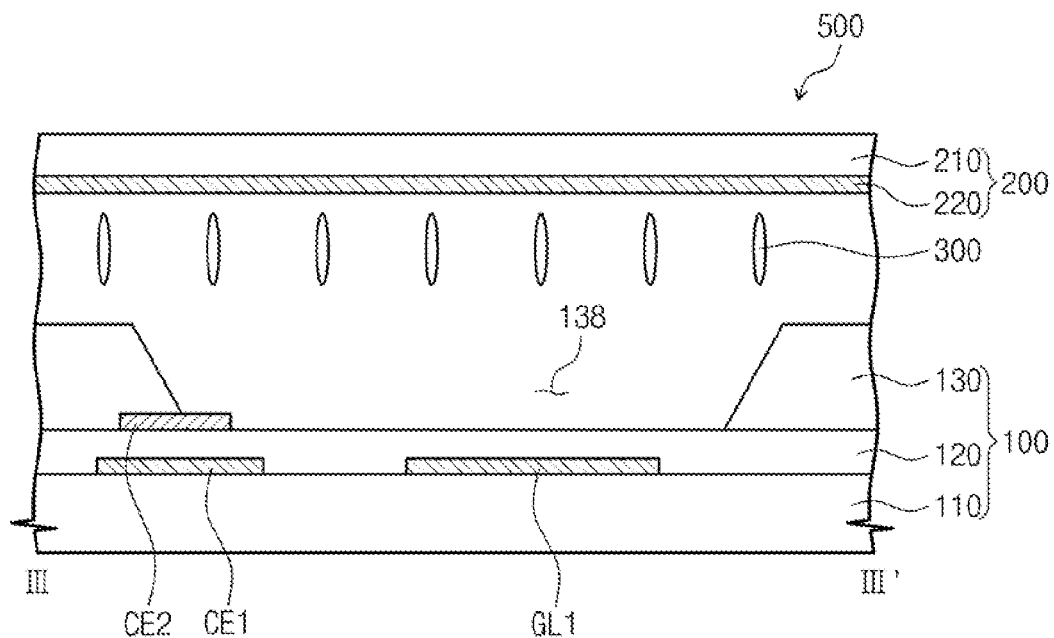
FIG. 17 is a cross-sectional view taken along a line III-III' of FIG. 16.

FIG. 16 is a layout showing the pixel of FIG. 15, and FIG. 17 is a cross-sectional view taken along a line III-III' of FIG. 16.

Referring to FIGS. 16 and 17, a liquid crystal display 500 includes a first substrate 100, a second substrate 200 coupled with the first substrate 100 and facing the first substrate 100, and a liquid crystal layer 300 disposed between the first and second substrates 100 and 200.

The first substrate 100 includes a first base substrate 110, the first and second gate lines GL1 and GL2 extending in the first direction D1 on the first base substrate 110, and the first and second data lines DL1 and DL2 extending substantially in parallel to each other in the second direction D2.

The first substrate 100 further includes a first storage line SL1 extending in the first direction D1 and first and second branch electrodes LSL1 and RSL1 that are branched off from the first storage line SL1 and extended in the second direction D2. Also, the first substrate 100 further includes a second storage line SL2 extending in the first direction D1 and third and fourth branch electrodes LSL2 and RSL2 that are branched off from the second storage line SL2 and extended in the second direction D2.

The first thin film transistor Tr1 includes the first gate electrode GE1 that is branched off from the first gate line GL1, the first source electrode SE1 that is branched off from the first data line DL1, and the first drain electrode DE1 electrically connected to a first pixel electrode PE1.

The first pixel electrode PE1 is partially overlapped with the first storage line SL1 and the first and second branch electrodes LSL1 and RSL1 to form the first storage capacitor Cst1 (shown in FIG. 15).

The second thin film transistor Tr2 includes the second gate electrode GE2 that is branched off from the first gate line GL1, the second source electrode SE2 that is branched off from the first data line DL1, and the second drain electrode DE2 electrically connected to a second pixel electrode PE2.

The second pixel electrode PE2 is partially overlapped with the second storage line SL2 and the third and fourth branch electrodes LSL2 and RSL2 to form the second storage capacitor Cst2 (shown in FIG. 15).

The first substrate 100 further includes the third thin film transistor Tr3 and the coupling capacitor Ccp. The third thin film transistor Tr3 includes the third gate electrode GE3 branched from the second gate line GL2, the third source electrode SE3 extended from the second drain electrode DE2, and the third drain electrode DE3 connected to the coupling capacitor Ccp. The coupling capacitor Ccp includes a first coupling electrode CE1 extended from the second branch electrode RSL1 and a second coupling electrode CE2 extended from the third drain electrode DE3. However, the structure of the coupling capacitor Ccp should not be limited thereto.

Referring to FIG. 17, the first substrate 100 further includes a gate insulating layer 120 and a protective layer 130.

The protective layer 130 is provided with a first opening 138 that is overlapped with the first coupling electrode CE1 and the first gate line GL1. As an exemplary embodiment, the first coupling electrode CE1 is spaced apart from the first gate line GL1 at a distance of about 9 μm. As shown in FIG. 16, because the first coupling electrode CE1 is branched from the first storage line SL1, the first coupling electrode CE1 receives a common voltage that is applied to the first storage line SL1. During operation of the display, the first gate line GL1 receives a gate signal having a low state during most of the time in one frame period, except for one horizontal scanning period.

When the first opening 138 is formed through the protective layer 130, a direct-current electric field is formed between the first coupling electrode CE1 and the first gate line GL1. Thus, impurity ions that are mobile may be trapped in an area where the first opening 138 is formed by the direct-current electric field.

The second substrate 200 includes a second base substrate 210, a black matrix 220, and a common electrode 230. The black matrix 220 is formed in an area corresponding to a non-display area of the first substrate 100. The non-display area may be defined as an area where the first and second data lines DL1 and DL2, the first to third thin film transistors Tr1, Tr2, and Tr3, the coupling capacitor Ccp, and the first and second gate lines GL1 and GL2 are formed. Because the first and second pixel electrodes PE1 and PE2 are not formed in the non-display area, liquid crystal molecules in the non-display area are not aligned, and as a result light leakage through the liquid crystal layer may occur. Consequently, the black matrix 220 formed in the non-display area may prevent the light leakage from the display.

The first opening 138 may, for example, be formed in an area corresponding to an area where the black matrix 220 is formed, and thus, the impurity ions trapped in the area where the first opening 138 is formed may be prevented from being perceived as a spot in the display.

The common electrode (not labeled or indicated in FIG. 17) faces the first pixel electrode PE1 to form the first liquid crystal capacitor Clc1 (FIG. 15). Although not shown in figures, the common electrode faces the second pixel electrode PE2 to form the second liquid crystal capacitor Clc2.

Although not shown in figures, the second substrate 200 may further include a color filter layer.

The liquid crystal layer 300 includes liquid crystal molecules that are aligned substantially perpendicular to an upper surface of the first base substrate 110 when no electric field is applied to the liquid crystal layer 300 (OFF state). When an electric field is formed between the first pixel electrode PE1 and the common electrode 230, and between the second pixel electrode PE2 and the common electrode 230, the liquid crystal molecules may be aligned by the electric field.

Although not shown in figures, an alignment direction of the liquid crystal molecules depends on a first alignment layer and a second alignment layer that are respectively formed on the first and second substrate 100 and 200.

A pre-tilt angle that is inclined in two different alignment directions may be formed in the first alignment layer formed in the first substrate 100. Additionally, a pre-tilt angle that is inclined in two different alignment directions may be formed in the second alignment layer that is formed in the second substrate 200. Thus, when no electric field is applied to the liquid crystal layer (OFF state), the first and second alignment layers may vertically align the liquid crystal molecules of the liquid crystal layer (not shown) by the pre-tilt angle.

The first and second alignment layers may include a polymer material, such as polyvinyl cinnamate-based material (PVCN), polysiloxane cinnamate-based material (PSCN), cellulose cinnamate-based material (CelCN), etc., which generates the photo excitation reaction (e.g., decomposition, isomerization, dimerization) by irradiating a light, e.g., an ultraviolet ray or a visible light ray.

When the first and second substrates 100 and 200 are coupled to each other, a plurality of domains is formed between the first and second substrates 100 and 200 by the alignment directions of the first and second alignment layers. The liquid crystal molecules may be aligned in different directions in the different domains. As an exemplary embodiment, the liquid crystal molecules may be aligned in a direction that is defined by a sum of vectors of the alignment directions of the first and second alignment layers. As described above, the liquid crystal display may provide a wide viewing angle by forming domains that each have a different alignment direction in the pixel area.

Figure 18:
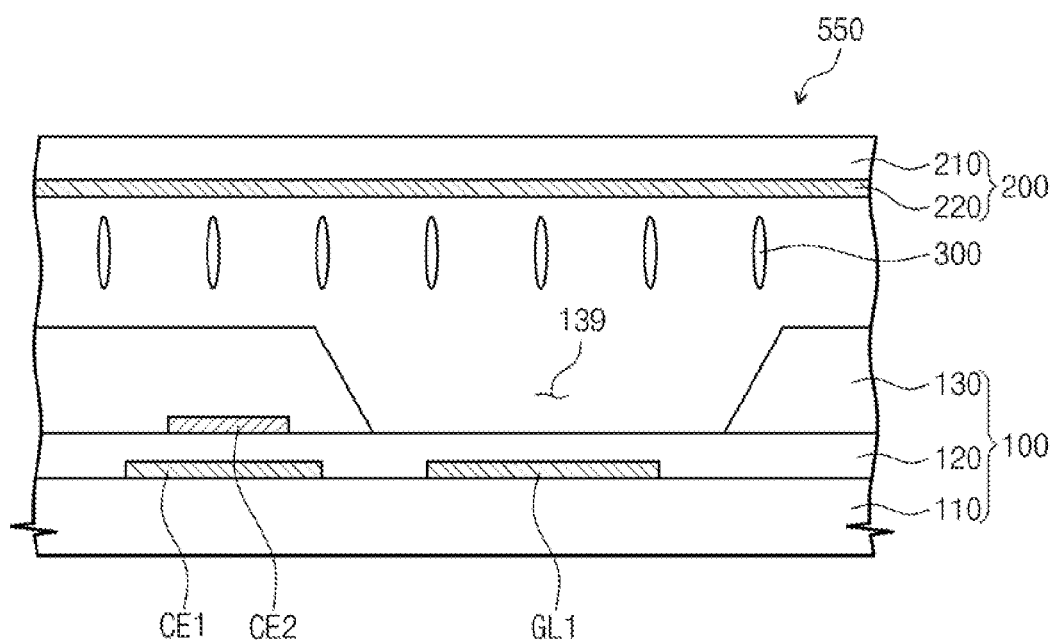
FIG. 18 is a cross-sectional view showing a liquid crystal display according to another exemplary embodiment.

FIG. 18 is a cross-sectional view showing a liquid crystal display according to another exemplary embodiment.

Referring to FIG. 18, a liquid crystal display 550 includes a first substrate 100, a second substrate 200 coupled to the first substrate 100 and facing the first substrate 100, and a liquid crystal layer 300 disposed between the first and second substrates 100 and 200.

The first substrate 100 includes a protective layer 130 provided with an opening 139 that is overlapped with a first gate line GL1. During operation of the display, the first gate line GL1 receives a gate signal having a low state during most of the time in the one frame period, except for one horizontal scanning period.

As described above, when the first opening 139 is formed through the protective layer 130, a direct-current electric field may be formed between a common electrode 230 and the first gate line GL1. In the present exemplary embodiment, the first gate line GL1 is spaced apart from the common electrode 230 at a distance of about 6 μm. Thus, when the protective layer 130 is removed between the common electrode 230 and the first gate line GL1, the direct-current electric field has an intensity that is enough to trap impurity ions. Thus, the impurity ions that are mobile may be trapped by the direct-current electric field in an area where the first opening 139 is formed, thereby preventing the line-shaped after-image.

Although the exemplary embodiments have been described, it is understood that the present invention should not be limited to these exemplary embodiments but various changes and modifications can be made by one ordinary skilled in the art within the spirit and scope of the present disclosure.

What is claimed is:

1. A display apparatus comprising:
   a first substrate on which a plurality of pixels is arranged; and
   a second substrate coupled to the first substrate to face the first substrate,
   wherein each of the pixels comprises:
      at least one gate line;
      at least one storage line that is spaced apart from the gate line in a plan view;
      at least one data line that crosses the gate line;
      at least one switching device connected to the gate line and the data line;
      a protective layer provided with a first opening, the protective layer is formed in an area where the gate line and the storage line are arranged adjacent to each other; and
      at least one pixel electrode arranged on the protective layer and overlapped with the storage line,
   wherein the first opening is overlapped with at least one of the gate line, the storage line, and both of the gate and data lines.

2. The display apparatus of claim 1, wherein the pixel electrode comprises a first pixel electrode and a second pixel electrode that receive different voltages from each other.

3. The display apparatus of claim 2, wherein the data line comprises a first data line and a second data line that are arranged in parallel to each other and are spaced apart from each other with a predetermined distance, and the switching device comprises a first switching device including a first gate electrode connected to the gate line, a first source electrode connected to the first data line, and a first drain electrode connected to the first pixel electrode and a second switching device including a second gate electrode connected to the gate line, a second source electrode connected to the second data line, and a second drain electrode connected to the second pixel electrode.

4. The display apparatus of claim 3, wherein the first opening is overlapped with the gate line and the storage line.

5. The display apparatus of claim 4, wherein each of the pixels comprises:
   a plurality of protruding patterns that protrude from the storage line toward the gate line in the area where the first opening is formed; and
   a plurality of second protruding patterns that protrude from the gate line toward the storage line in the area where the first opening is formed, each of the second protruding patterns being arranged between two adjacent first protruding patterns.

6. The display apparatus of claim 4, wherein each of the pixels further comprises:
   a third protruding pattern that protrudes from the storage line in the area where the first opening is formed;
   a fourth protruding pattern extended substantially in parallel to the gate line from the third protruding pattern;

a fifth protruding pattern extended from the first gate electrode and arranged between the storage line and the fourth protruding pattern; and a sixth protruding pattern extended from the second gate electrode and arranged between the storage line and the fourth protruding pattern.

7. The display apparatus of claim 4, wherein the first drain electrode and the second drain electrode are exposed through the first opening, the first pixel electrode is electrically connected to the first drain electrode through the first opening, and the second pixel electrode is electrically connected to the second drain electrode through the first opening.

8. The display apparatus of claim 4, wherein the first and second drain electrodes are overlapped with the storage line in a plan view, and a distance between the gate line and each of the first and second drain electrodes is larger than a distance between the storage line and the gate line.

9. The display apparatus of claim 2, wherein the gate line comprises a first gate line and a second gate line that are arranged substantially in parallel to each other and are spaced apart from each other with a predetermined distance, and the switching device comprises a first switching device including a first gate electrode connected to the first gate line, a first source electrode connected to the data line, and a first drain electrode connected to the first pixel electrode and a second switching device including a second gate electrode connected to the second gate line, a second source electrode connected to the data line, and a second drain electrode connected to the second pixel electrode.

10. The display apparatus of claim 9, wherein each of the pixels further comprise:

a first coupling electrode that is branched off from the storage line;

a second coupling electrode facing the first coupling electrode with a gate insulating layer interposed therebetween; and a third switching device including a third gate electrode connected to a next gate line arranged next to the gate line, a third source electrode connected to the second pixel electrode, and a third drain electrode connected to the second coupling electrode.

11. The display apparatus of claim 10, wherein the first opening is overlapped with the gate line and the first coupling electrode.

12. The display apparatus of claim 10, wherein the second substrate comprises a common electrode facing the first and second pixel electrodes, and the first opening is formed in an area where the first gate line is formed.

13. The display apparatus of claim 2, wherein the storage line has a closed loop shape including at least two portions that are substantially parallel to the gate line, and the first opening is overlapped with the gate line and the two portions of the storage line.

14. The display apparatus of claim 2, wherein the storage line comprises a first power line and a second power line that receive different voltages from each other and that are arranged substantially parallel to each other while being spaced apart from each other with a predetermined distance, and the switching device comprises a first switching device including a first gate electrode connected to the gate line, a first source electrode connected to the data line, and a first drain electrode connected to the first pixel electrode and a second switching device including a second gate electrode connected to the gate line, a second source electrode connected to either the first power line or the second power line, and a second drain electrode connected to the second pixel electrode.

15. The display apparatus of claim 14, wherein the gate line is arranged between the first power line and the second power line, and the first opening is overlapped with the gate line, the first power line, and the second power line.

16. The display apparatus of claim 15, wherein the first and second drain electrodes are exposed through the first opening, the first pixel electrode is electrically connected to the first drain electrode through the first opening, and the second pixel electrode is electrically connected to the second drain electrode through the first opening.

17. The display apparatus of claim 15, wherein the first drain electrode is overlapped with the first power line in a plan view and the second drain electrode is overlapped with the second power line in a plan view, and a distance between the first drain electrode and the gate line is larger than a distance between the first power line and the gate line, and a distance between the second drain electrode and the gate electrode is larger than a distance between the second power line and the gate line.

18. The display apparatus of claim 1, wherein the protective layer further comprises a second opening formed in an area corresponding to the data line.

19. The display apparatus of claim 1, wherein each of the pixels further comprises a dummy pixel electrode that is spaced apart from the pixel electrode in a plan view.

20. The display apparatus of claim 1, wherein the first substrate is divided into a display area and a non-display area, the second substrate includes a black matrix formed at a position corresponding to the non-display area of the first substrate, and the first opening is formed in the non-display area.

* * * * *